(12) United States Patent
Koriyama et al.

(10) Patent No.: US 6,212,030 B1
(45) Date of Patent: Apr. 3, 2001

(54) MAGNETIC DISK DRIVE HAVING MEANS FOR REDUCING DISK DEFORMATION

(75) Inventors: Hiroshi Koriyama; Norio Tagawa; Kenji Itoh; Misa Iwamoto; Takahiro Suzuki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/381,306

(22) Filed: Jan. 31, 1995

(30) Foreign Application Priority Data

Jan. 31, 1994 (JP) .................................................. 6-027317

(51) Int. Cl.⁷ .................................................. G11B 17/08
(52) U.S. Cl. .......................................................... 360/98.08
(58) Field of Search ............................. 360/98.02, 98.07, 360/98.08, 99.08, 99.12, 99.05; 369/270, 271

(56) References Cited

U.S. PATENT DOCUMENTS

| | | | |
|---|---|---|---|
| 4,764,828 | * 8/1988 | Gollbach | 360/98.08 |
| 4,945,432 | * 7/1990 | Matsudaira et al. | 360/98.02 |
| 5,006,942 | * 4/1991 | Brooks et al. | 360/98.08 |
| 5,089,922 | * 2/1992 | LeClair | 360/99.08 |
| 5,101,306 | * 3/1992 | Johnson | 360/98.08 |
| 5,136,450 | * 8/1992 | Moir | 360/135 |
| 5,267,106 | * 11/1993 | Brue et al. | 360/98.02 |
| 5,317,225 | * 5/1994 | Miyaji et al. | 360/98.08 |
| 5,392,178 | * 2/1995 | Nishio et al. | 360/99.08 |
| 5,436,775 | * 7/1995 | Ishimatsu | 360/98.08 |
| 5,452,157 | * 9/1995 | Chow et al. | 360/98.08 |
| 5,457,589 | * 10/1995 | Leuthold et al. | 360/99.12 |

* cited by examiner

Primary Examiner—David Davis
(74) Attorney, Agent, or Firm—McGuireWoods LLP

(57) ABSTRACT

A clamping structure for disk drive for receiving a disk includes a spindle hub, a spacer, and a clamp ring. The spindle hub has a flange at a first end thereof. The flange has a first protruding portion. The discs are stacked on the first protruding portion. The first spacer is interposed between adjacent ones of the disks. The clamp ring is fixed to a second end of the spindle hub. The clamp ring has a second protruding portion for biasing the disks toward the flange of the spindle hub. In a process of forming a holder arm of the disk drive, the tip of a holder arm is contoured by wire cutting method after the holder armed is roughly formed from a metal body. In the wire cutting method, a voltage is placed between the metal body and the wire. The tip of the holder is contoured by the wire by bringing the wire into contact with the metal body.

2 Claims, 14 Drawing Sheets

MAGNETIC DISK DRIVE HAVING MEANS FOR REDUCING DISK DEFORMATION

BACKGROUND OF THE INVENTION

The present invention relates to a magnetic disk drive, and particularly to a magnetic disk drive having means for reducing disk deformation.

A flying head with a small air gap between the head and a disk are used in a magnetic disk drive. A high density recording requires an accurate positioning of the flying head. The position of the flying head can be divided into vertical and lateral components. The vertical position is the flying height or the air gap of the head. The lateral position is the position along the radius of the disk.

Preferably, the air gap is decreased because the decreased air gap enhances the electromagnetic transducing characteristic and allows the storage capacity to be increased. Products with an air gap of less than 0.1 $\mu$m have recently been marketed.

However, the decreased air gap increases the probability of a head crash in which a head crashes against a disk and destroys information stored in the disk. A factor causing a head crash is disk deformation such as warpage and "wave" (e.g., buckling or waviness) illustrated in FIG. 1.

Referring to FIG. 1, warpage and wave are deformation radially and concentrically of the disk, respectively. More specifically, warpage of a disk is the difference in height between an innermost point A and an outermost point B on a radius. The disk deformation causes variation of the air gap. The variation of the air gap produces data read/write errors and may ultimately result in a head crash.

The extent of the disk deformation depends on a clamping mechanism that fixes the disks to a spindle hub. Referring to FIG. 2, a structure of a conventional magnetic disk is illustrated having four disks 100, and a spindle assembly 10 which comprises a spindle shaft 1 and a spindle hub 2. The spindle hub 2 is supported rotatably by the spindle shaft 1 via bearings 3A and 3B.

The spindle hub 2 has a cylindrical shape and has a flange 2A at its bottom end. The magnetic disks 100 and spacer rings 4 are alternately stacked on the flange 2A of the spindle hub 2 while the spindle hub 2 is fittedly inserted in the openings of the disks and spacer rings. A disk-like clamp ring 5 is placed on the top disk 100 and is attached to the top of the spindle hub 2 with screws (unreferenced). The disks 100 and spacer rings 4 are clamped between the clamp ring 5 and the flange 2A of the spindle hub 2. The disks 100 are affixed to the spindle hub 2 by pressure exerted by the screws.

The bottom surface of the clamp ring 5 and the top surface of the flange 2A of the spindle hub 2 that contact the disks 100 are flat so as to keep the disks 100 flat and parallel to one another.

However, this conventional clamping structure cannot reduce warpage of the disks 100 to less than 20 $\mu$m because of an unavoidable irregular distribution of the clamping pressure.

Furthermore, in magnetic disk devices, the lateral positioning of the head must be precise to follow data tracks because track width has been generally decreased to increase track density. Lateral positioning accuracy is deteriorated by deformation of holder arms holding the heads. Arm deformation becomes critical when the track widths are decreased to less than 10 $\mu$m. To complicate problems, the arms are becoming thinner so as to downsize the disk drive. This makes the holder arms prone to deformation.

Moreover, the deformation of the holder arms during manufacturing is unavoidable as stated below.

Specifically, the holder arms are formed by die-casting. However, since the arms are relatively thin, molten metal does not flow smoothly especially at the end portion of the die mold. This results in deformation of the arms and in blow holes being formed in the arms. Vibrations and loads during the processing also cause arm deformation.

SUMMARY OF THE INVENTION

In view of the foregoing problems of the conventional system, one object of the present invention is to enhance the positioning accuracy of a head.

Another object of the present invention is to enhance the accuracy of a vertical head position or an air-gap.

Another object of the present invention is to enhance the accuracy of a lateral head position.

Another object of the present invention is to reduce disk deformation.

Another object of the present invention is to reduce deformation of holder arms.

According to the present invention, a clamping structure for clamping a plurality of disks includes a spindle hub for receiving the disks, a first spacer, and a clamp ring. The spindle hub has a flange at a first end thereof. The flange has a first protruding portion. The disks are stacked on the first protruding portion. The first spacer is interposed between adjacent ones of the disks.

The clamp ring is fixed to a second end of the spindle hub. The clamp ring has a second protruding portion for biasing the magnetic disks toward the flange of the spindle hub.

Among the aforementioned structure, the first and second protruding portions are one feature of the present invention and are for reducing the deformation of the disks.

Other spacers can be added to the aforementioned structure for reducing the waviness as well as the warpage of the discs.

In a first embodiment, a second spacer is interposed between the second protruding portion of the clamp ring and an uppermost one of the disks.

In a second embodiment, a third spacer is interposed between the first protruding portion of the spindle hub and a lowermost one of the disks.

The first and second protruding portions preferably have an annular shape. They can have various cross-section such as rectangular, trapezoidal, triangular, and elliptical cross-sections.

The deformation of the disks can be minimized when the diameters of the first and second protruding portions are substantially identical.

A groove may be provided in an outer circumference of the first spacer for further reducing the disk deformation when the second and third spacers cannot be provided. The groove should be provided in the uppermost and lowermost ones of the first spacers.

The fourth embodiment of the present invention is a process for reducing deformation of holder arms. The holder arm is used in a disk drive for holding a head. The fourth embodiment reduces the deformation occurring during a contouring of a tip of the holder arm.

In step (a) of the process, a metal body is cut and the holder arm is formed. In step (b), the tip of the holder arm is contoured by a wire cutting method.

The wire cutting method generally comprises the following steps. In step (b-1), a voltage is placed between the metal body and a wire. In step (b-2), the wire is moved. In step (b-3), the wire is brought into contact with the metal body. The metal body is preferably produced by extruding metal through a die to form the metal body.

The wire cutting method can contour the tip of the holder arm with less deformation than that of the conventional method such as die casting.

BRIEF DESCRIPTION OF THE DRAWINGS

Other objects, features and advantages of the present invention will become wore apparent when the following description is read in conjunction with the accompanying drawings, wherein:

FIGS. 6, 7, 8, and 9 show the sectional view of the protruding portions 5A and 2a.

In these drawings, the same reference numerals depict the same parts, respectively.

DESCRIPTION OF THE PREFERRED EMBODIMENTS

The first, second, and third embodiments are directed to structures for enhancing the accuracy of a vertical position of a flying head and thus an air gap between the head and a disk to be read or written to by reducing disk deformation.

It is noted that while the description below refers to a head for reading information from a disk, the invention is obviously applicable to a head for writing/recording information on the disk.

The fourth embodiment is directed to a manufacturing process of the holder arms for enhancing the accuracy of the dimensions thereof, and thereby, for enhancing the accuracy of a lateral position of a flying head fixed thereon.

Figure 1:
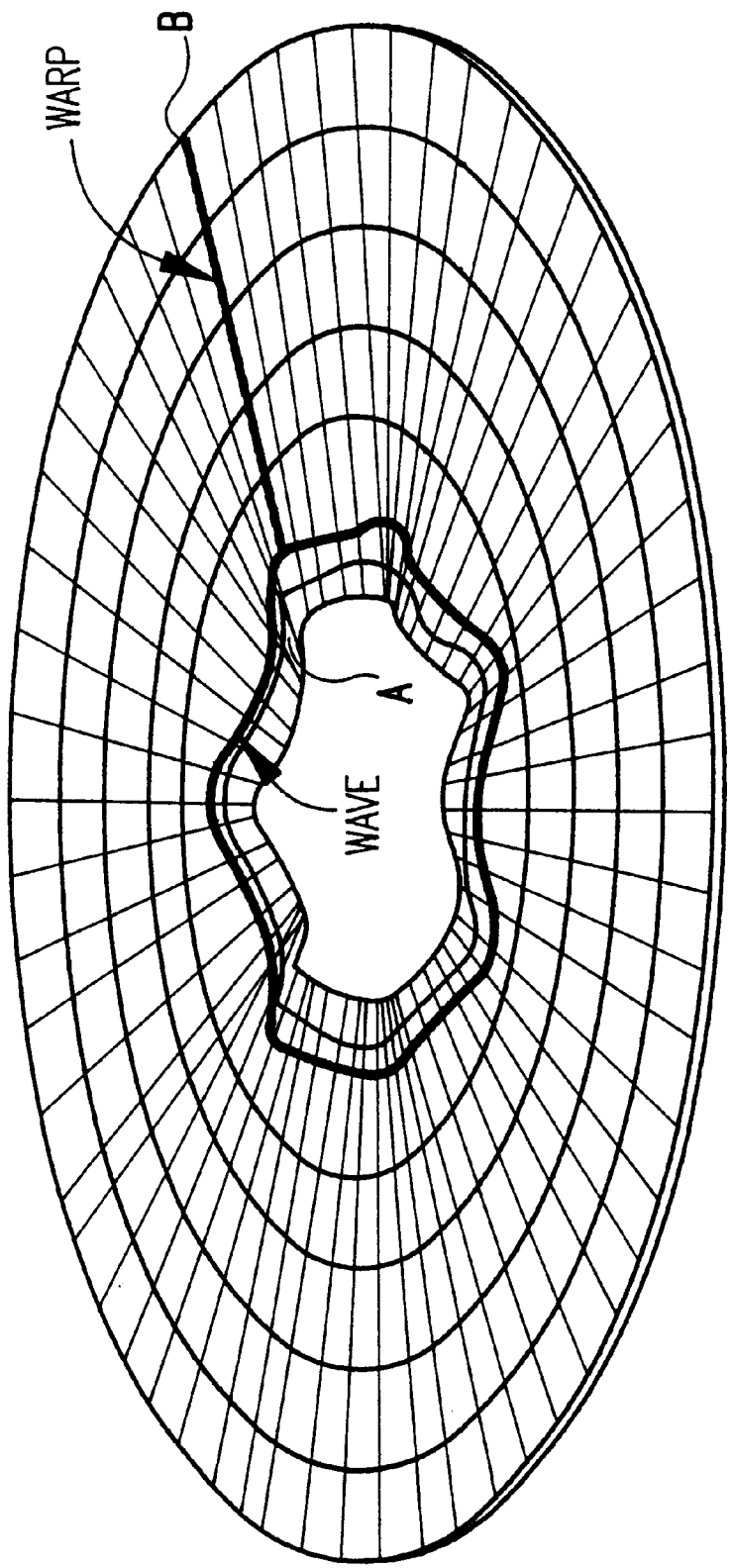
FIG. 1 illustrates a warpage and a wave of a disk.
Figure 2:
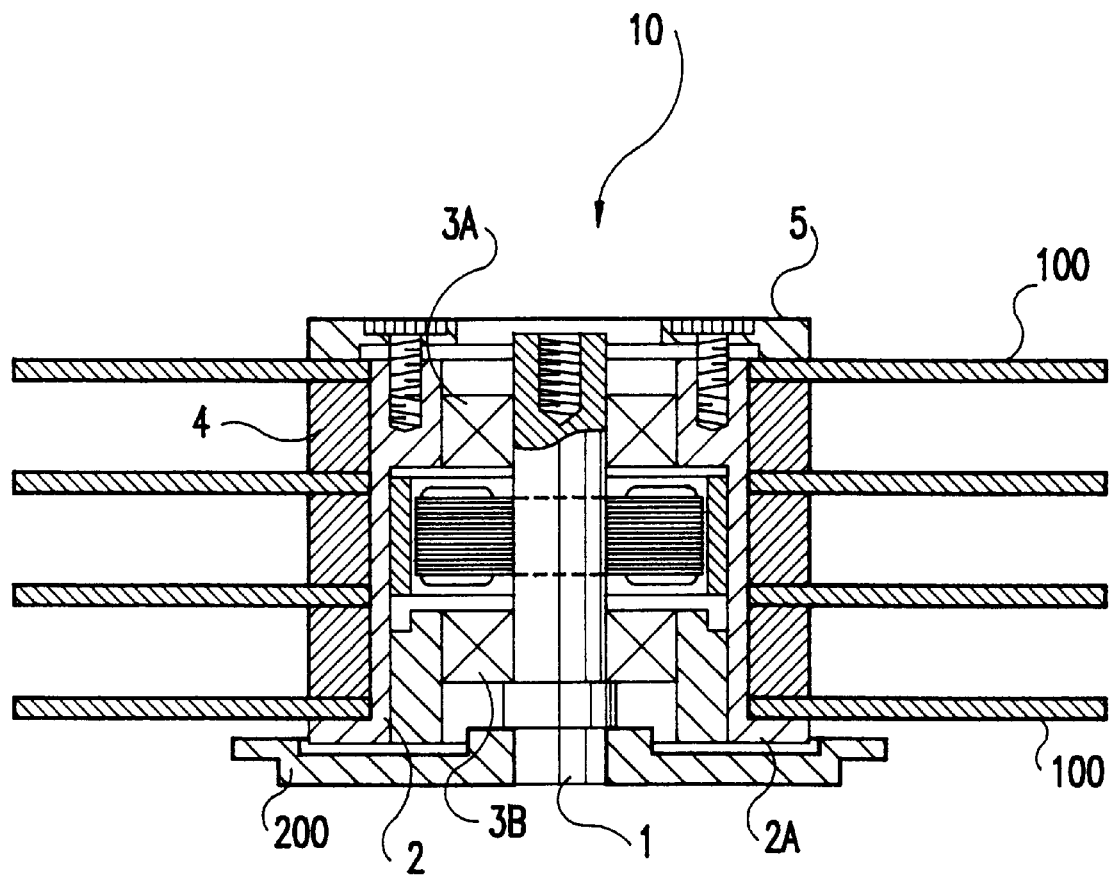
FIG. 2 is a sectional view of a conventional clamping structure.
Figure 3:
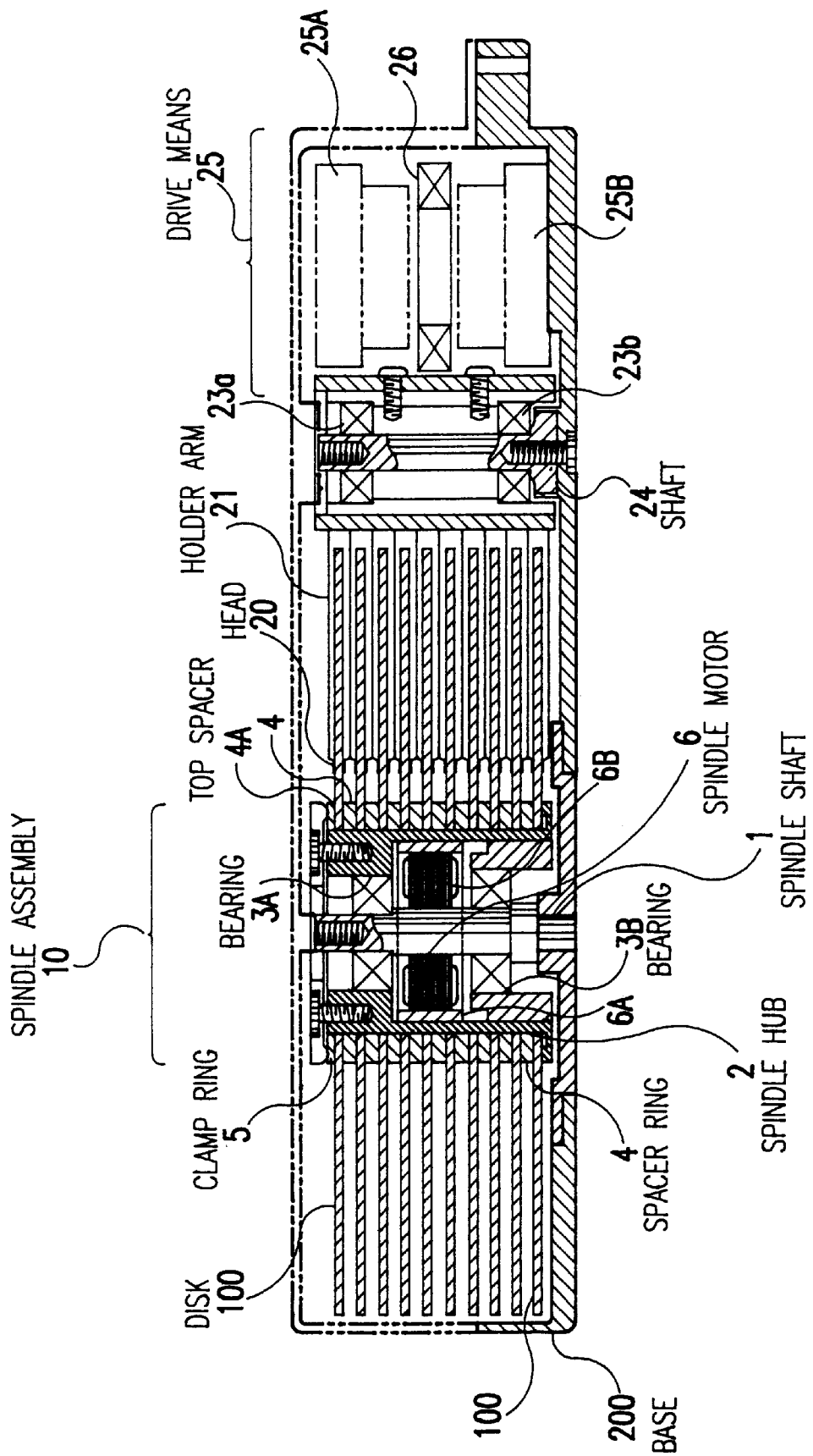
FIG. 3 is a sectional view of a magnetic disk according to a first embodiment of the present invention.

Referring to FIG. 3, a magnetic disk drive according to the first embodiment of the present invention comprises magnetic disks 200 and heads 20. The disks 100 are affixed to and are rotated by a spindle assembly 10 on a bass 200. With rotation of the disks 100, the heads 20 fly over the corresponding disks 100 with a slight air gap formed therebetween and the heads read out the information recorded in the disks 100.

The spindle assembly 10 comprises a clamping structure for clamping the disks 100 and a driving structure for rotating the clamping structure together with the disks 100.

The driving structure comprises a spindle shaft 1, spindle motor 6, and bearings 3A and 3B. The spindle shaft 1 has first and second ends thereof affixed to the base 200. The bearings 3A and 3B support a spindle hub 2, one element of the clamping structure discussed below, rotatably about the spindle shaft 1. The spindle motor 6 rotates the spindle hub 2 and comprises coil winding portions 6B and magnets 6A attached to the spindle hub 2.

Figure 4A:
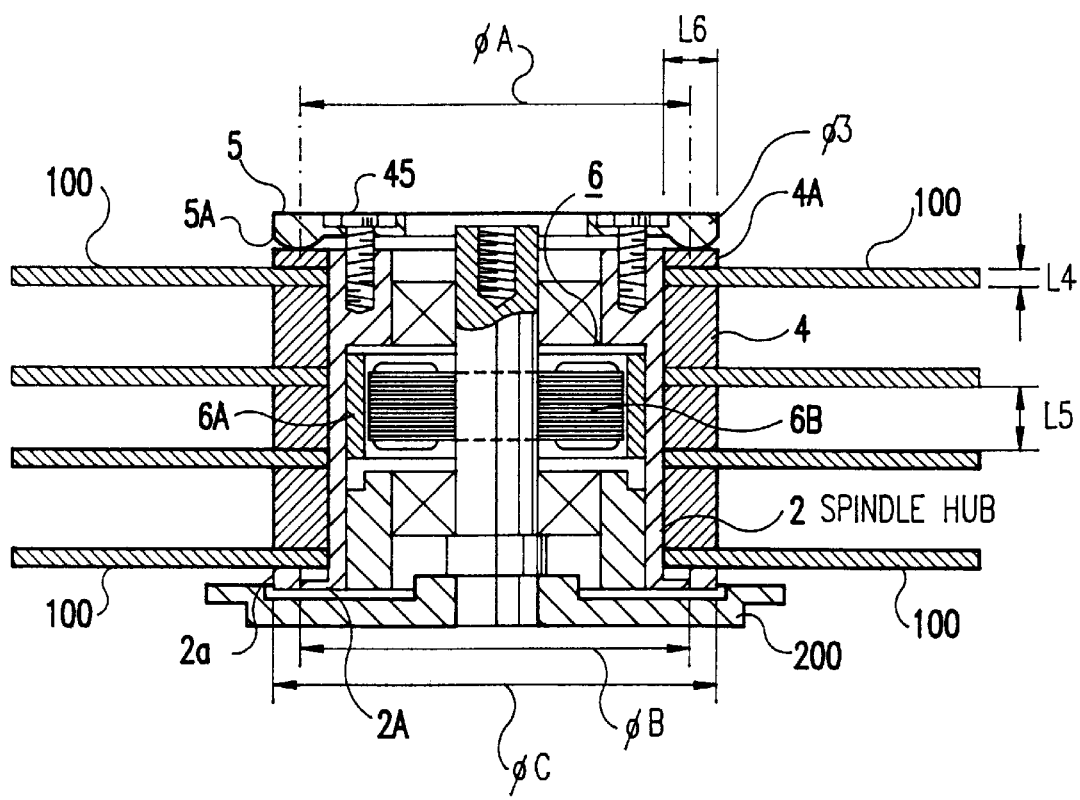
FIG. 4(a) is a sectional view of a clamping structure according to the first embodiment of the present invention.

Referring to FIG. 4(a) depicting details of the clamping structure with four exemplary disks 100, the clamping structure comprises the spindle hub 2, a clamp ring 5, fasteners (e.g., screws 45), and a top spacer 4A. The feature of the first embodiment resides in the novel shapes of the spindle hub 2 and the clamp ring 5.

The cylindrical spindle hub 2 has an annular flange 2A at the lower end thereof. The flange 2A has a first annular protruding portion 2a on its upper surface- The center of the spindle hub 2 and the first protruding portion 2a correspond to one another. The first protruding portion 2a preferably has a rectangular cross-section. Hereinafter, the inner and outer diameters of the first protruding portion are referred to as $\Phi_B$ and $\Phi_C$, respectively.

Figure 4B:
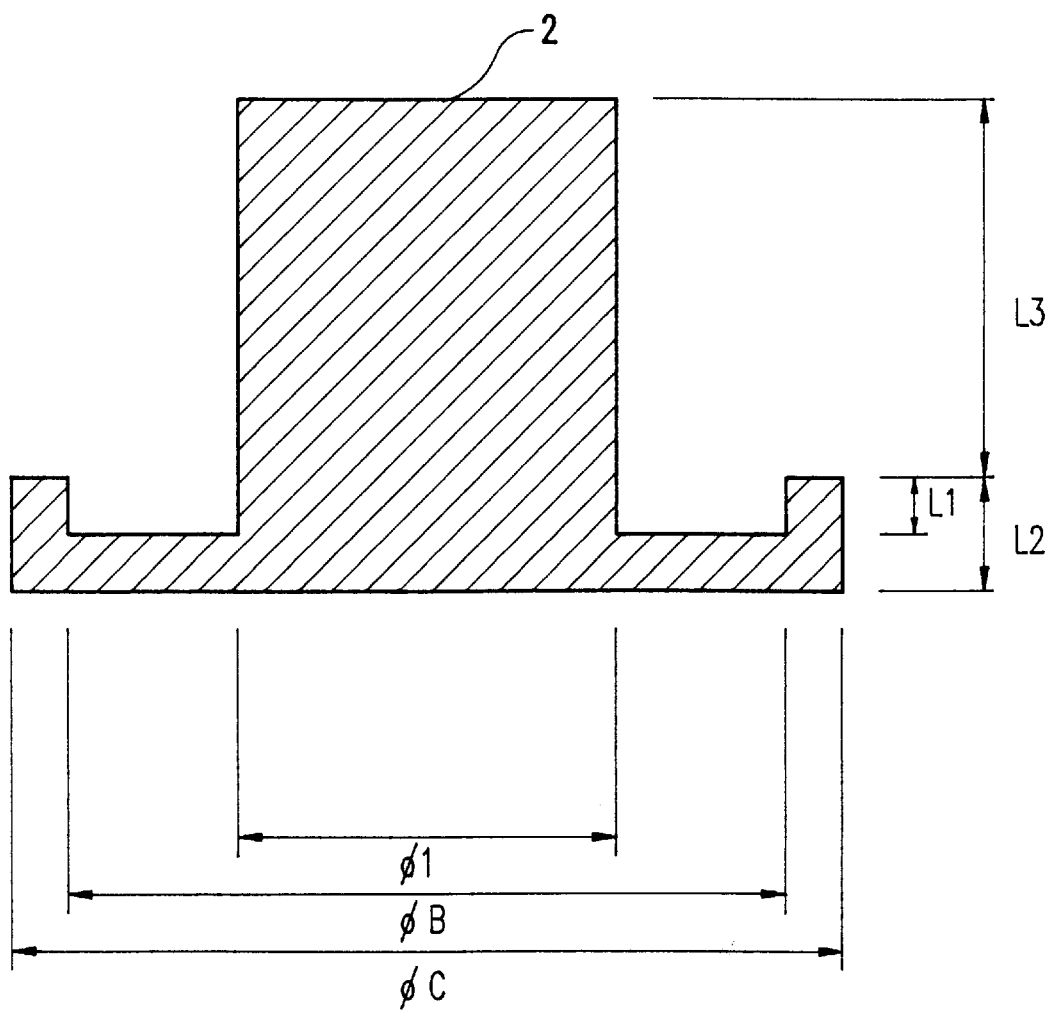
FIG. 4(b) shows the dimensions of a spindle hub in the structure of the invention.

Referring to FIG. 4(b), the diameter $\Phi_1$, the height L3 of the spindle hub 2 is approximately 24.8 to 25 mm and 5 to 25 mm, respectively. The height L3 of the spindle hub 2 depends on the number of the disks 100. The height L2 of the flange 2A including the first protruding portion 2a is approximately 1 to 2 mm. The diameter $\Phi_C$ of the flange 2A is approximately 32 mm. The height L1 of the first protruding portion 2a is approximately 0.1 to 0.5 mm. The spindle hub 2 is preferably made of an iron-based material or aluminum.

Referring again to FIG. 4(a), the spindle hub 2 receives the disks 100 through their center openings. The first disk 100 (e.g., the lowermost disk of the plurality of disks 100) is stacked on the first protruding portion 2a of the spindle hub 2. Thereafter, a spacer ring 4 is received by the spindle hub 2 and a second disk is stacked on the spindle hub 2. Thus, spacer rings 4 are interposed between adjacent ones of the disks 100. The openings of the disks 100 and the spacer rings 4 fit the spindle hub 2 so that the disks 100 and the spacer rings 4 closely and fittedly contact the spindle hub 2.

The diameter of the disks 100 is approximately 3.5 inches. The disks 100 are approximately 0.6 to 1.3 mm in thickness and are preferably made of aluminum.

The inner diameter and the outer diameter of the spacer rings 4 are 25 mm and 32 mm, respectively. The height L5 of the spacer rings 4 is approximately 1.5 to 5 mm. The spacer rings 4 also are preferably made of aluminum.

The top spacer 4A, which has an annular shape, is put on the top one of the disks 100. The top spacer 4A is 0.5 to 5.3 in thickness. The material of the top spacer 4A is described below.

The disk-shaped clamp ring 5 is positioned on the spacer ring 4A. The clamp ring 5 is preferably made of an iron-based material or aluminum. A second annular protruding portion 5A is provided on the lower surface of the clamp ring 5. The centers of the clamp ring 5 and the second protruding portion 5A correspond to one another. The second protruding portion has a semi-circular cross-section. The diameter $\Phi_2$ of the cross-section of the second protruding portion 5A is 2 to 10 mm.

The clamp ring 5 is attached to the spindle hub 2 by suitable fasteners (e.g., screws 45) As the clamp ring 5 is fastened to the spindle hub 2, the second protruding portion 5A biases the top spacer 4A, the disks 100, and the spacer rings 4 toward the first protruding portion 2a of the spindle hub 2. Thus, the disks 100 are clamped between the clamp ring 5 and the flange 2A of the spindle hub 2 to thereby reduce warpage.

When the clamp ring 5 is fastened to the spindle hub 2, the tip of the semi-circular second protruding portion 5A presses the top spacer 4A. The tip of the semi-circular second protruding portion 5A forms a circle. Hereinafter, the diameter of this circle is referred to as a mean pressing diameter or $\Phi_A$. The reduction of the disk deformation depends on selection of the mean pressing diameter as described below.

The aforementioned clamping structure reduces the deformation of the disks 100. More specifically, the warpage of the disks 100 is reduced from 20 $\mu$m or more to about 10 $\mu$m.

Selecting the diameters $\Phi_A$, $\Phi_B$ and $\Phi_C$ is and is further reduces the deformation of the disks 100 as discussed below.

Figure 5:
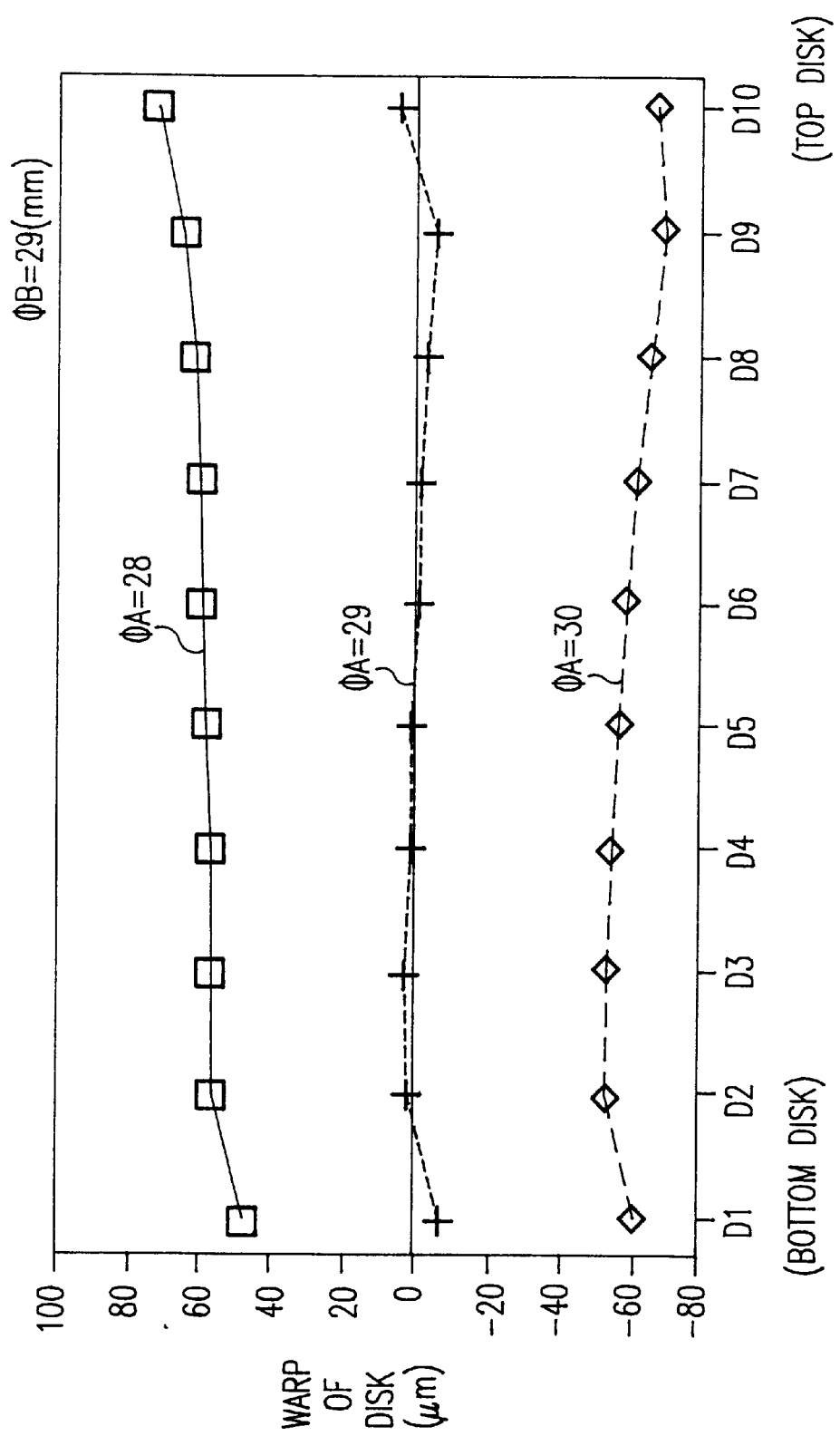
FIG. 5 shows the warpage of disks relative to the position of the disks clamped by the clamping structure according to the first embodiment of the present invention.
Figure 6:
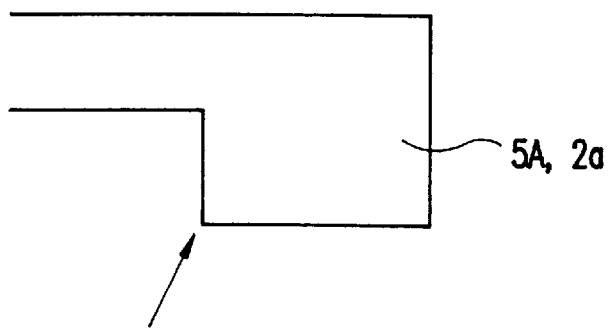
Figure 7:
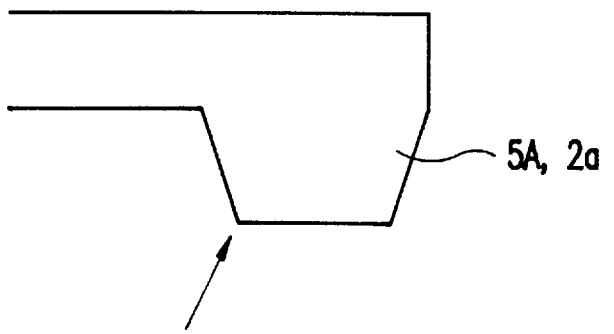
Figure 8:
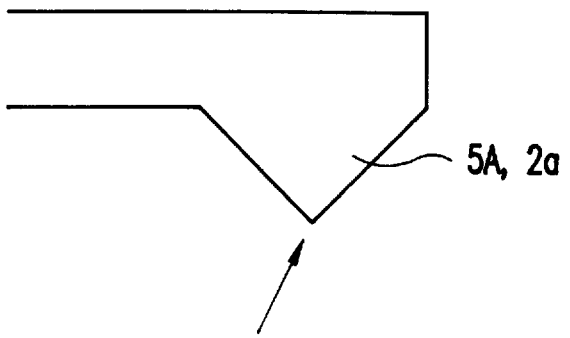
Figure 9:
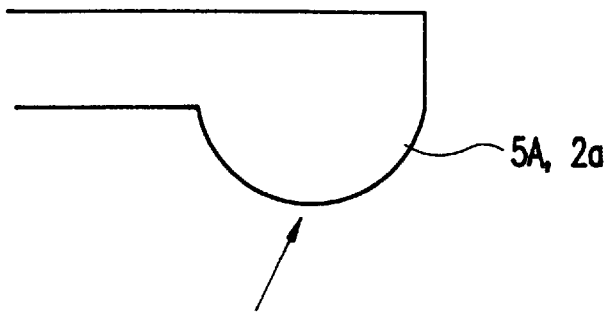

Referring to FIG. 5 showing the warpage of the disks 100 obtained by numerical analysis (e.g., a finite factor method) in which $\Phi_C$ is set to 32 mm, the deformation of the disks 100 can be minimized or reduced to less than 2 $\mu$m when $\Phi_A$ and $\Phi_B$ are set to 29 mm. Generally, disk deformation is minimized when the $\Phi_A$ and the $\Phi_B$ are set substantially equal to one another.

Disk deformation can be further reduced if a material whose Young's modulus is at least 20,000 kg/mm$^2$ is selected as the material of the top spacer 4A.

Preferable materials include iron-based materials whose Young's modulus is 20,000 to 25,000 kg/mm$^2$ such as SUS 410, SUS 405, SUS 631, Inconel 600, Inconel X750, and SKD 6. Preferable materials also include ceramic material whose Young's modulus is 20,000 to 35,000 kg/mm$^2$ such as silicone carbide, silicone nitride, and alumina. The top spacer should be selected among the aforementioned materials considering the displacements of the medium attributable to changes in temperature, resistivity to shock and impact, cost, type of dust and other contaminants typically encountered, electric grounding, etc.

This selection of the material of the top spacer 4A reduces the waviness (e.g., the buckling) of the disks 100 as well as the warpage thereof. Further, experiments have shown that the waviness of the disk 100 due to the screws of the clamp ring 5 can be reduced to about one-fifth of the conventional systems.

Next, the modification of the first and second protruding portions are described.

Referring to FIGS. 6–9, the cross-sections of the first and second protruding portions 2a and 5A can be modified to have various shapes. FIGS. 6–9 respectively depict rectangular, trapezoidal, triangular, and elliptical cross-sections of the protruding portions. The arrows in FIG. 6–9 indicate the points which define the mean pressing diameter $\Phi_A$.

Hereinbelow is described the second embodiment of the present invention.

Figure 10:
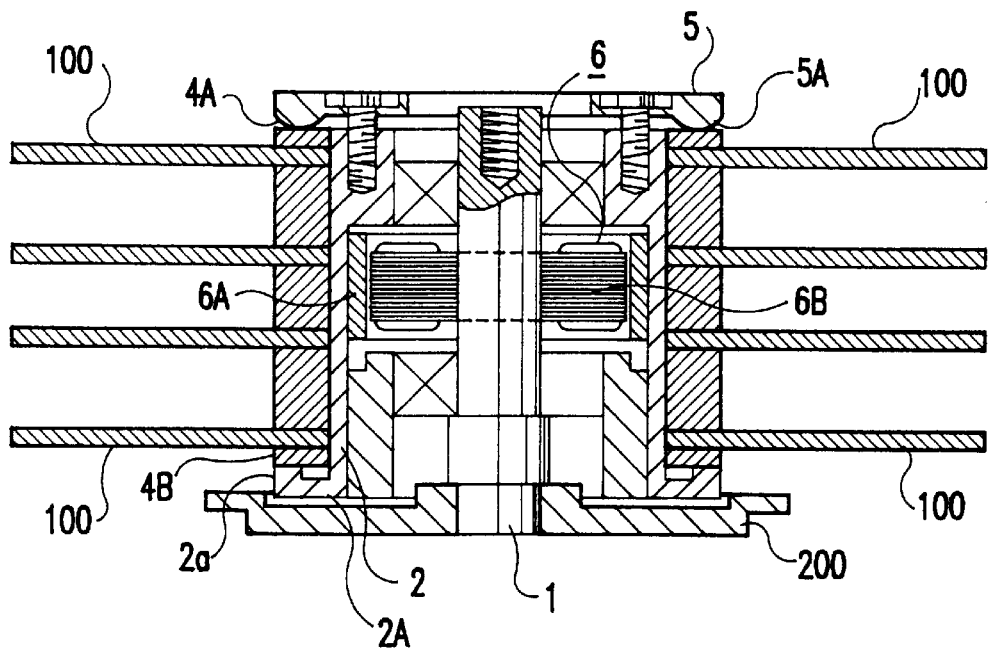
FIG. 10 is a sectional view of a clamping structure according to a second embodiment of the present invention.

Referring to FIG. 10, the feature of the second embodiment is providing a bottom spacer 4B. With respect to other structures and functions, the second embodiment is the same as the first embodiment.

The bottom spacer 4B is interposed between the first protruding portion 2a and the lowermost one of the disks 100. The size and the material of the bottom spacer 4B are the same as those of the top spacer 4A described in the first embodiment.

The bottom spacer 4B reduces the waviness and buckling of the disks 100. The structure of the second embodiment is effective when the flange 2A of the spindle hub 2 has a low processing accuracy. The optimization of $\Phi_A$, $\Phi_B$, and $\Phi_C$ is also desirable in the second embodiment.

Hereinbelow is described the third embodiment of the present invention.

Figure 11:
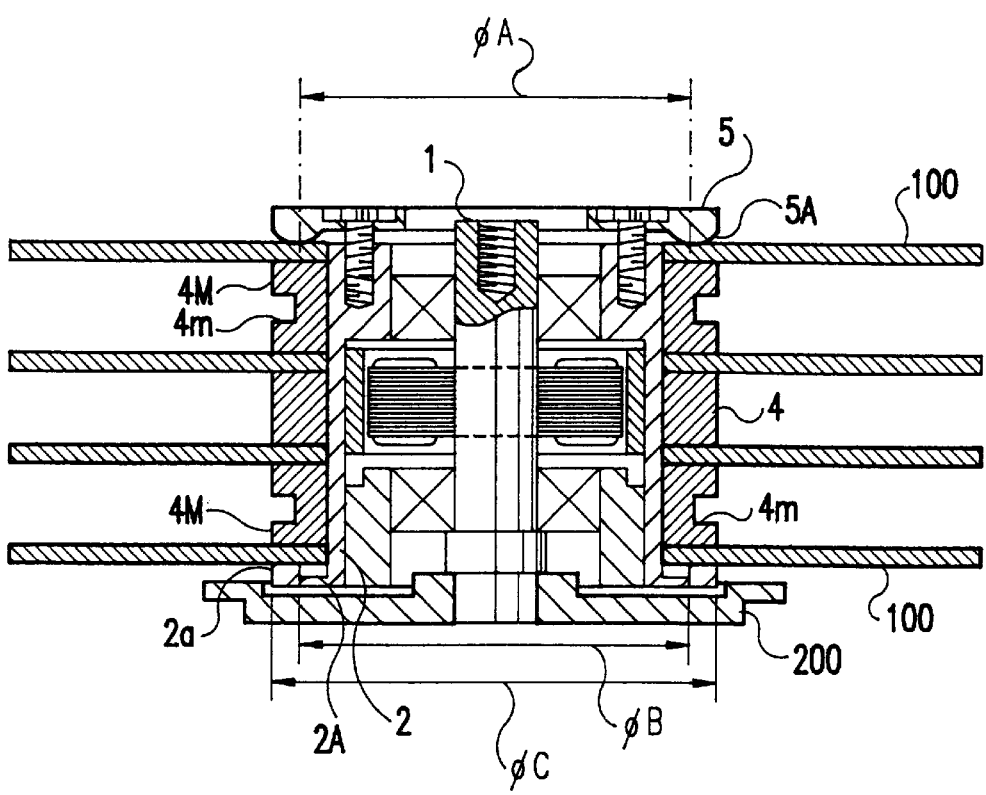
FIG. 11 is a sectional view of a clamping structure according to a third embodiment of the present invention.

Referring to FIG. 11, the feature of the third embodiment resides in replacing the top and the bottom spacer rings 4 of the first embodiment with spacer rings 4M having annular grooves 4m The top spacer 4A and the bottom spacer 4B are removed. With respect to other structures and the functions, the third embodiment is the same as the first embodiment.

The structure of the third embodiment is especially advantageous when the top spacer 4A and the bottom spacer 4B cannot be mounted (e.g., cannot receive a disk stacked thereon). This situation occurs when the available space in the disk drive is limited because of its miniaturization or the like.

The spacer rings 4M are provided with annular grooves 4m in the outer circumference thereof. The material, the size and the construction of the spacer rings 4M are the same as those of the spacer rings 4 except for the groove 4m. One of the spacer rings 4M is positioned below the uppermost one of the disks 100, Another spacer ring 4M is positioned above the lowermost one of the disks 100. The other spacer rings 4 do not have a groove.

The size and dimensions of grooves 4m are selectively optimized to minimize the warpage of the disks 100. Specifically, when $\Phi_A$, $\Phi_B$, and $\Phi_C$ are respectively 29 mm, 29 mm, and 32 mm, the groove 4m should preferably be 0.2 to 1.0 mm wide and 0.6 to 0.9 mm deep. The mean pressing diameter $\Phi_A$ of the protruding portion 5A of the clamp ring 5 is selected to coincide with the bottom of the annular grooves 4m of the spacer rings 4M to have an error of less than ±0.5 mm.

Figure 12:
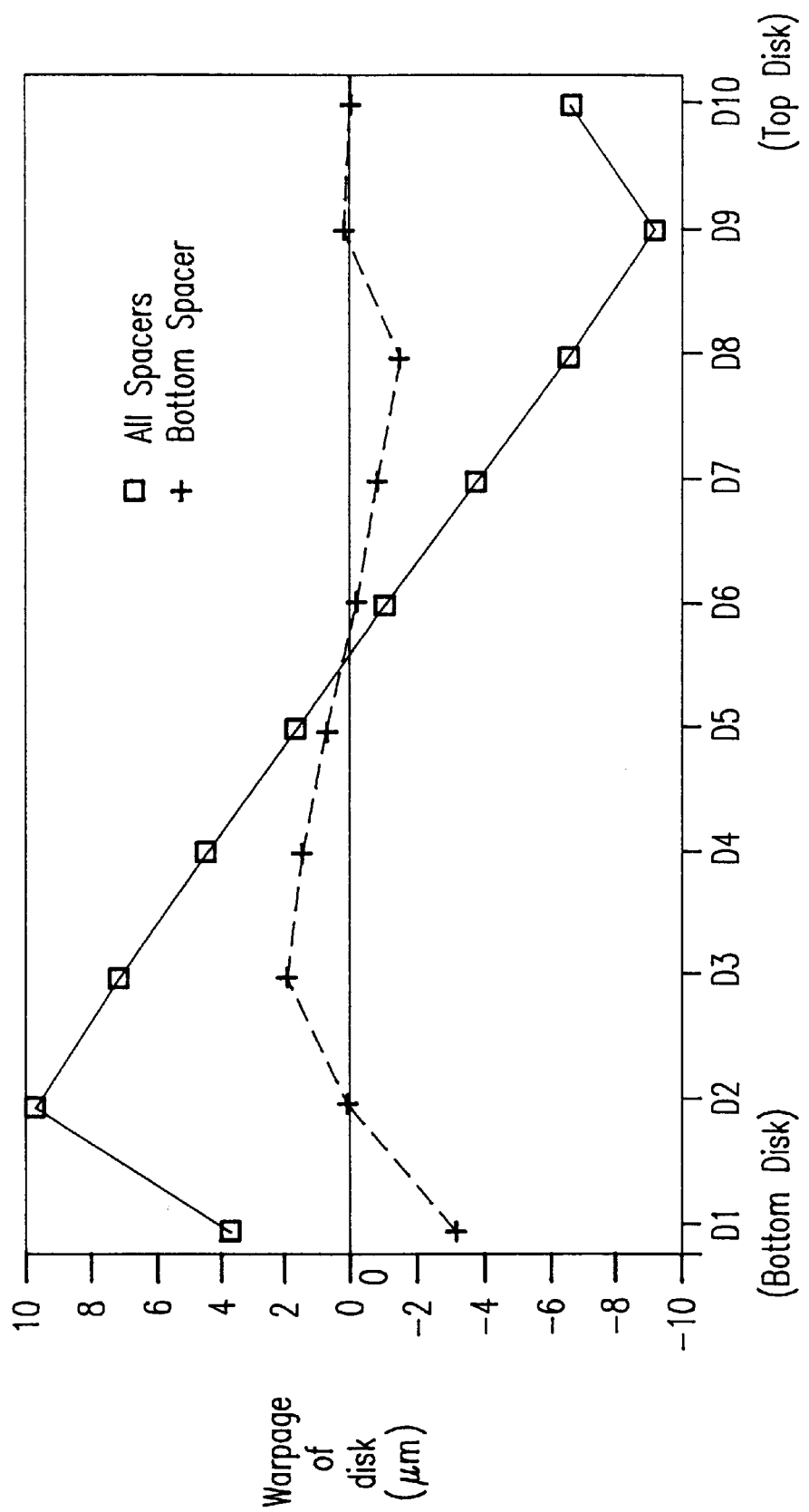
FIG. 12 shows the warpage of disks relative to the position of the disks clamped by the clamping structure according to the third embodiment of the present invention.

However, all the spacer rings 4 are replaced with the spacer rings 4M having a groove 4m, the reduction of the warpage is not as great as when only the top and bottom spacer rings include grooves 4m, as determined by testing. This is also supported by numeric analysis, the results of which are shown in FIG. 12. In FIG. 12, the solid line indicates the warpage when all the spacer rings 4 are replaced with the spacer rings 4M with grooves 4m. The dotted line indicates the warpage when only the top and bottom ones of the spacer rings 4 are replaced.

Hereinafter, a fourth embodiment of the present invention is described. The fourth embodiment is a manufacturing process of holder arms 21.

Firstly, the structures of the holder arms 21 and other elements coupled with them are described below.

Referring to FIGS. 3, 18, 19, and 20, the flying heads 20 each facing corresponding ones of the disks 100 are attached to one end of the holder arms 21. The bolder arms 21 are integrated with a cylindrical arm support 22. The arm support 22 is rotatably mounted on a shaft 24 via bearings 23a and 23b.

The arm support 22 is driven by a drive mechanism 25 such that the heads 20 travel over the disks 100 in a radial direction thereof. The drive mechanism 25 comprises a drive coil 26 and magnetic circuits 25A and 25B.

Figure 19:
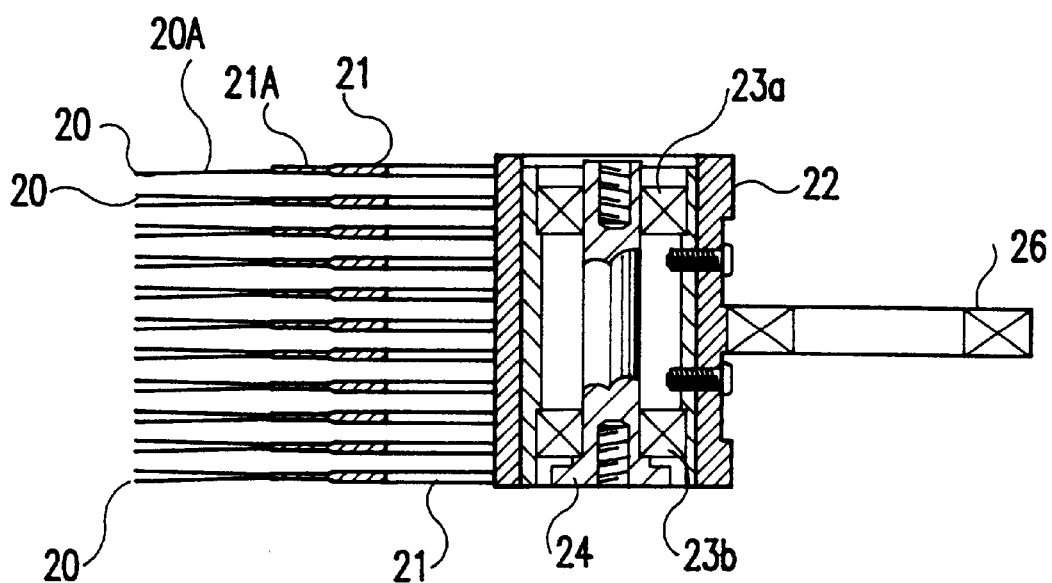
FIG. 19 is a sectional view of the arm manufactured by the process according to the fourth embodiment of the present invention.

Referring to FIG. 19, the holder arms 21 have a plate-like shape. Each of the holder arms 21 has a head mounting portion 21A. The head mounting portions 21A are integrated with corresponding ones of the holder arms 21. The head mounting portions 21A are relatively thinner than the other parts of the bolder arms 21.

Gimbal springs 20A are affixed to the head mounting portion 21A of the holder arms 21. The heads 20 are fixed to the gimbal springs 20A.

The accuracy of the head mounting portions 21A of the holder arms 21 directly affects the accuracy of the lateral position of the heads 20. A feature of the fourth embodiment is in forming the head mounting portion 21A by a wire cutting method to achieve high accuracy thereof.

Next, the manufacturing process of the fourth embodiment is described step by step.

Figure 13:
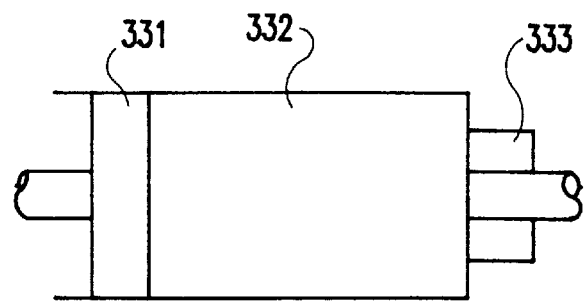
FIG. 13 illustrates the first step of the process of manufacturing according to a fourth embodiment of the present invention.
Figure 14:
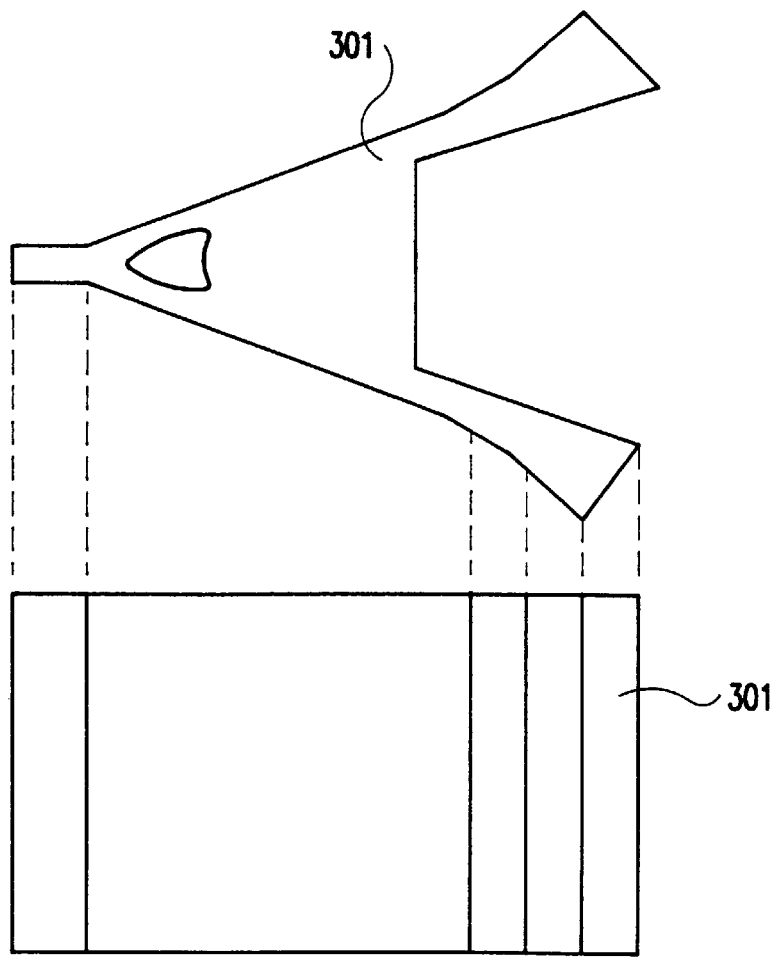
FIG. 14 shows a metal body 301 (an intermediate of the holder arms) produced by the first step of the process according to the fourth embodiment of the present invention.

Referring to FIGS. 13 and 14, in first step, a metal body 301 is molded by an extrusion method. An extrusion method is superior to die castings in terms of the strength of the holder arms 21 and the stability of the material of the holder arms 21.

The body 301 is pressed with a piston 331 and squeezed out of a mold 333. Being squeezed out from the opening of the mold 333, the material is formed into the shape depicted in FIG. 14.

A special aluminum alloy containing a greater amount of silicone, alumina or similar additive than ordinary aluminum alloys is preferably used for the body 301, in consideration of thermal off-tracking Such aluminum alloys have a smaller coefficient of linear expansion than ordinary aluminum alloys and reduce thermal strains due to a difference in the coefficient of linear expansion between the bearings 23a, 23b and the holder arms 21. Specifically, the linear expansion coefficient of such aluminum alloys is preferably approximately $3 \times 10^{-6}$ to $18 \times 10^{-6}$.

A light-weight magnesium alloy is preferably employed for the holder arms 21 to reduce weight and enhance operational speed. Further, an aluminum-beryllium alloy is preferable to enhance strength of the holder arms 21.

Figure 15:
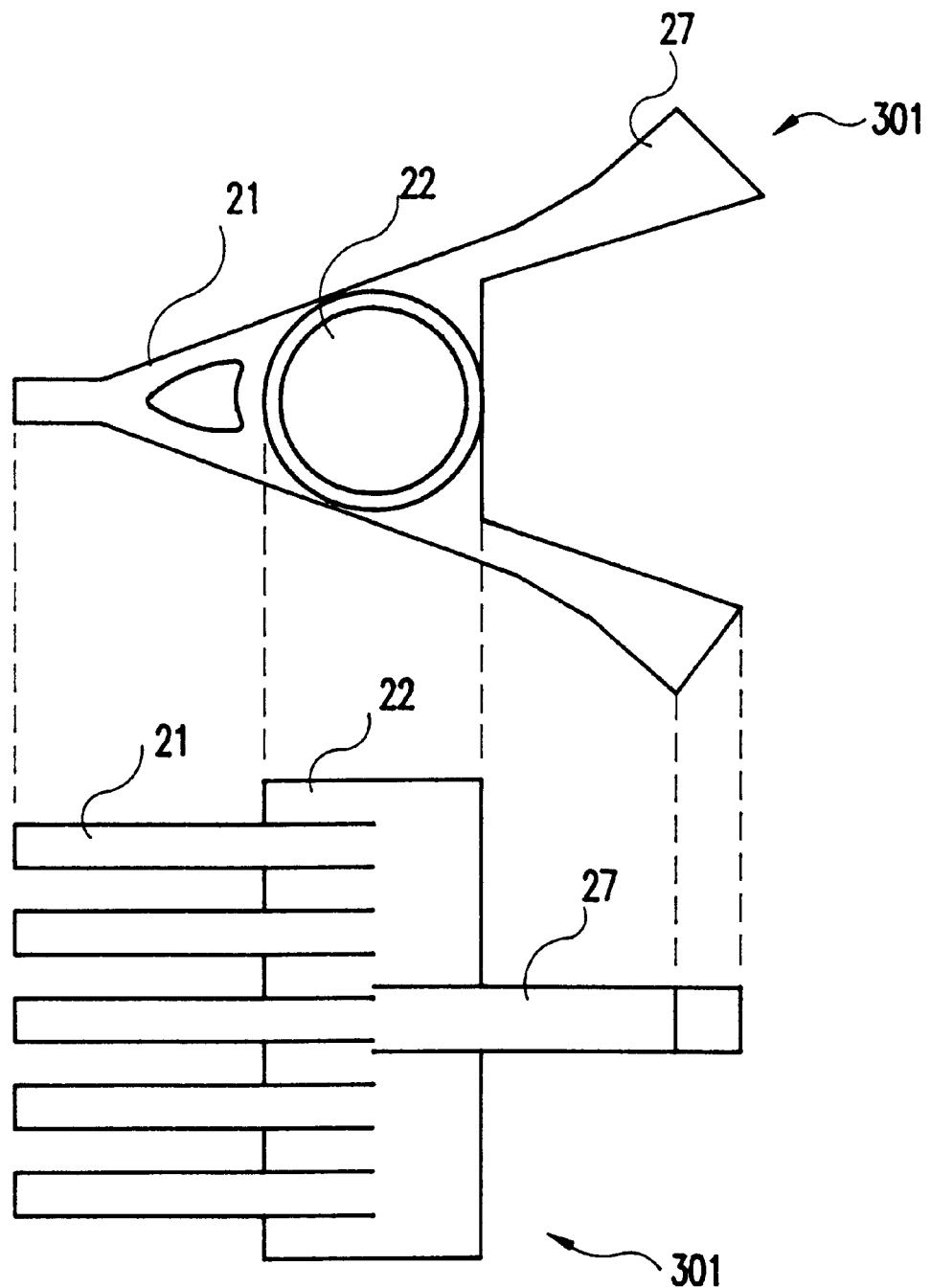
FIG. 15 shows the metal body 301 (the intermediate of the holder arms) produced by the second step of the process according to the present invention.

Referring to FIG. 15, in a second step, the body 301 is contoured with an and mill, lathe, or similar cutter. The holder arms 21, the arm support 22, and a coil mounting portion 27 are formed by this contouring.

Figure 16:
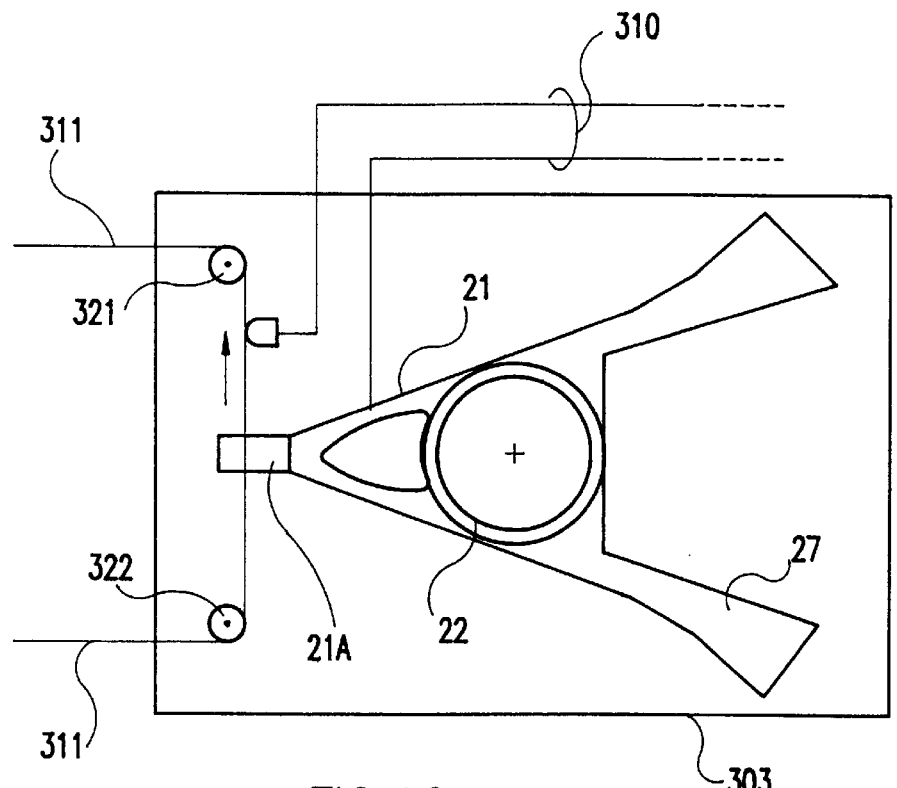
FIGS. 16 and 17 illustrate the third step of the process of manufacturing the arms of the present invention.
Figure 17:
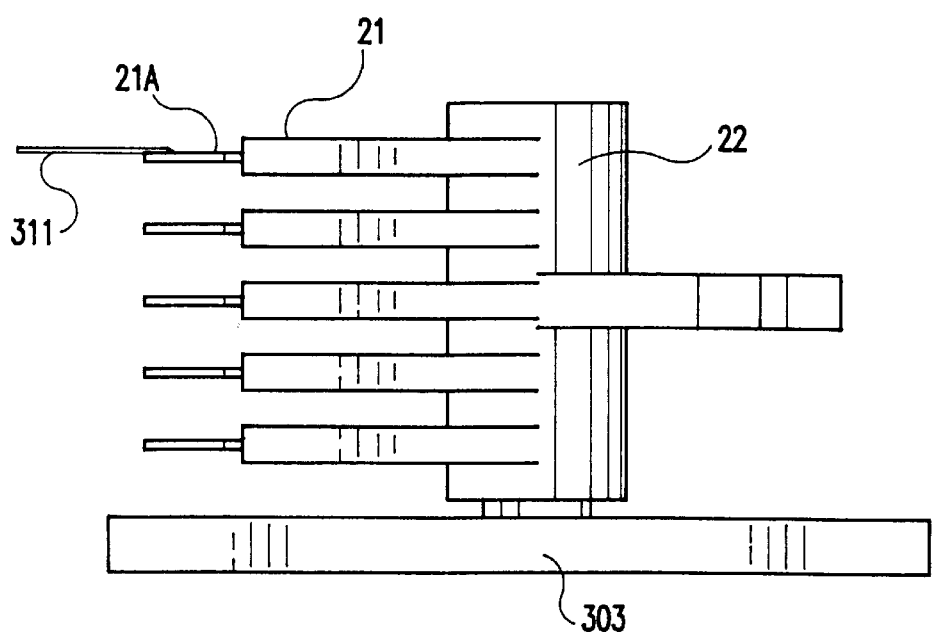

Referring to FIGS. 16 and 17, in a third step, the head mounting portions 21A are formed by a wire cutting method or the like.

In the wire cutting operation, the body 301 is affixed to a table 303 movable along X, Y, and Z axes. A first electrode of electrodes 310 is connected to the body 301. A second electrode of electrodes 310 contacts wire 311. A control current is fed from a discharge circuit to the holder arm 21 and the wire 311 via the electrodes 310. Simultaneously, the wire is moved in a rectilinear motion indicated by an arrow in FIG. 16. The body 301 is cut by the wire 311 when the wire 311 contacts with the body 301 in an electrode discharge method. The table 303, together with the body 301, are moved relative to the wire 311 to desirably contour the head mounting portions 21A of the holder arms 21.

The wire cutting method reduces strain in the holder arms 21 due to processing and vibrations exerted on the holder arms 21 during processing. Therefore, the wire cutting method contours the head mounting portions 23A with higher accuracy.

Figure 18:
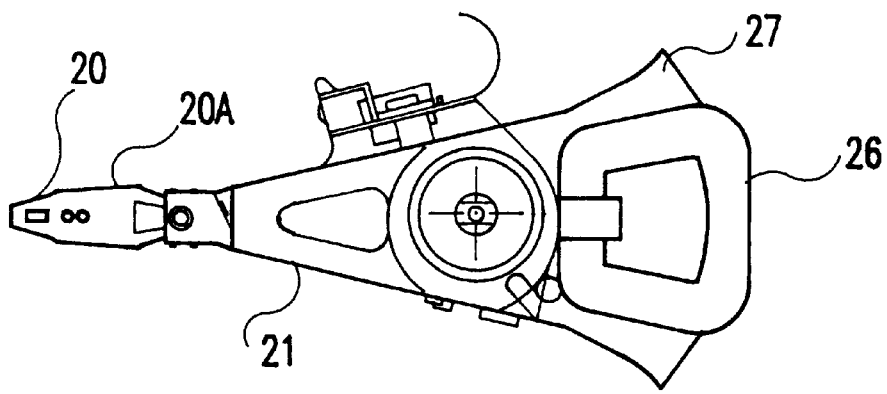
FIG. 18 is a plane view of the ark manufactured by the process according to the fourth embodiment of the present invention.

Referring to FIGS. 18, and 19, the heads 20 are coupled with the head mounting portions 21A via the gimbal springs 20A. The drive coil 26 is affixed to the coil mounting portion 27.

Figure 20:
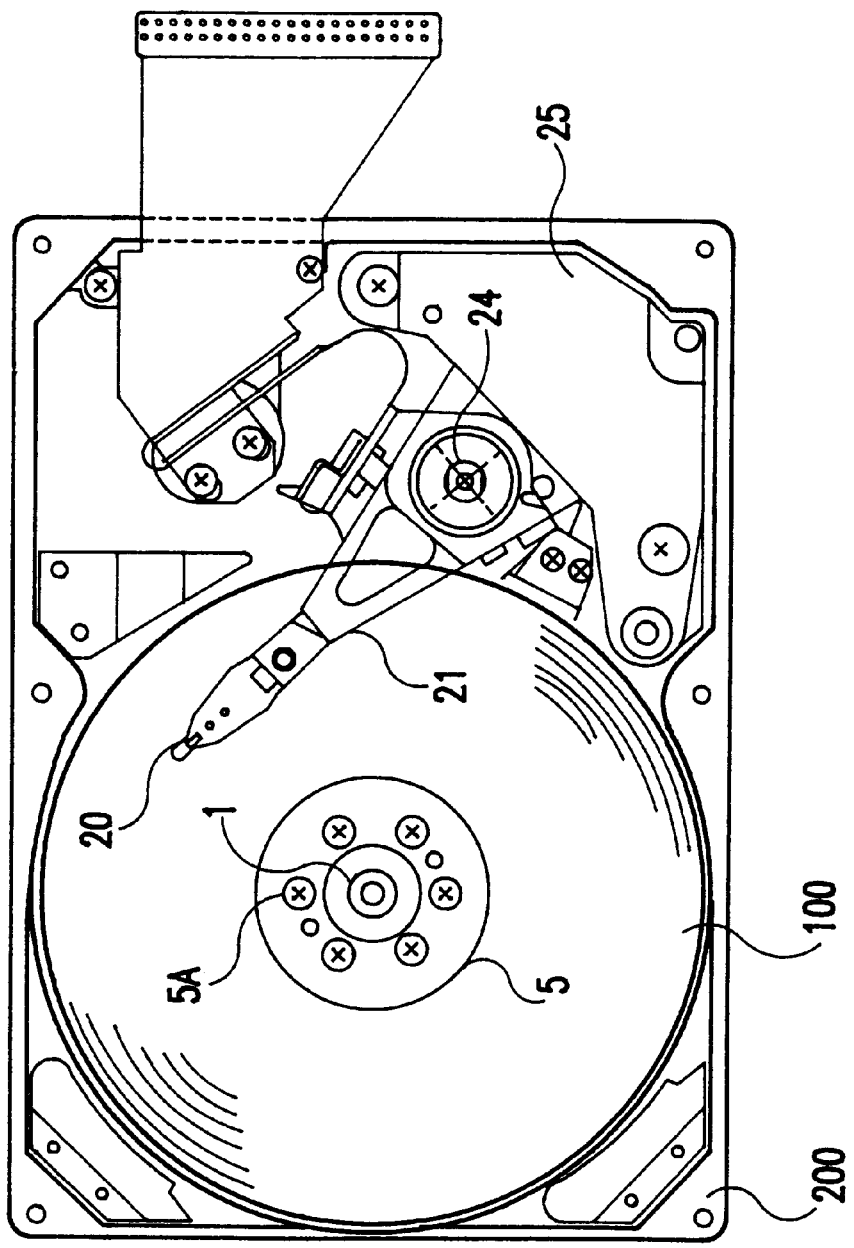
FIG. 20 is a plane view of the arm shown in FIGS. 18 and 19 assembled in a magnetic disk.

Referring to FIG. 20, the heads 20, the holder arms 21, the shaft 24, and the drive coil 26 are assembled in the disk drive.

Thus according to a fourth embodiment of the present invention the head mounting portions of the holder arms of the magnetic disk device are formed reliably with high precision such that optimum lateral positioning of the head is achieved.

The invention may be embodied in other specific forms without departing from the spirit or essential characteristics thereof. The present embodiment is therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A clamping structure for clamping n disks, wherein n is greater than 3, comprising:
   a spindle hub for receiving said disks and having a flange at a first end thereof, said flange having a first protruding portion, said disks being stacked on said first protruding portion;
   n−1 spacers interposed between adjacent ones of said n disks, said n−1 spacers including an uppermost spacer and a lowermost spacer; and
   a clamp ring fixed to a second end of said spindle hub, said clamp ring having a second protruding portion for biasing said disks toward said flange of said spindle hub,
   wherein only an outer circumference of said uppermost spacer and an outer circumference of said lowermost spacer include an annular groove.

2. A clamping structure according to claim 1, wherein a mean pressing diameter of said second protruding portion substantially coincides with a bottom surface of said groove.

* * * * *